(12) United States Patent
Cornell

(10) Patent No.: US 6,556,781 B2
(45) Date of Patent: Apr. 29, 2003

(54) ONE-TIME-USE CAMERA HAVING CLOSURE AND METHOD FOR PREPARING ONE-TIME-USE CAMERA FOR RECYCLING

(75) Inventor: David J. Cornell, Caledonia, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/957,197

(22) Filed: Sep. 20, 2001

(65) Prior Publication Data

US 2003/0053801 A1 Mar. 20, 2003

(51) Int. Cl.7 .............................................. G03B 17/02
(52) U.S. Cl. ............................................ 396/6; 396/538
(58) Field of Search ..................................... 396/6, 538

(56) References Cited

U.S. PATENT DOCUMENTS

| | | |
|---|---|---|
| 5,754,912 A | 5/1998 | Kobayashi |
| 5,812,897 A * | 9/1998 | Nishio ........................ 396/538 |
| 5,828,921 A * | 10/1998 | Miyawaki .................... 396/513 |
| 5,854,954 A | 12/1998 | Robertson |
| 5,867,739 A * | 2/1999 | Lamphron ................... 396/536 |
| 6,101,341 A | 8/2000 | Manabe |
| 6,130,997 A | 10/2000 | Okuno |

FOREIGN PATENT DOCUMENTS

| | | | |
|---|---|---|---|
| EP | 0 710 873 A1 | | 5/1996 |
| JP | 405158144 A | * | 6/1993 |
| JP | 2000-122236 | | 4/2000 |

* cited by examiner

Primary Examiner—Alan A. Mathews
Assistant Examiner—Andrew Sever
(74) Attorney, Agent, or Firm—Robert Luke Walker

(57) ABSTRACT

A one-time-use camera that has a body having a cartridge chamber and an opening at one end. A film transport is disposed in the body. The film transport has an advance element adjoining the cartridge chamber opposite the opening. A closure is disposed in the cartridge chamber. The closure is slidable along the cartridge chamber between a first position, in which the closure engages the advance element, and a second position, in which the closure closes the opening. After picture taking, a film door is moved away from the opening, a film cartridge is unloaded from the cartridge chamber, and the closure is moved to the second position closing the empty cartridge chamber.

26 Claims, 11 Drawing Sheets

ONE-TIME-USE CAMERA HAVING CLOSURE AND METHOD FOR PREPARING ONE-TIME-USE CAMERA FOR RECYCLING

FIELD OF THE INVENTION

The invention relates to cameras and photography and more particularly relates to a one-time-use camera having a closure and a method for preparing a one-time-use camera for recycling.

BACKGROUND OF THE INVENTION

One-time-use cameras used today are intended to be recycled. After the pictures are taken, the camera is turned in for photofinishing, and the film is removed from the camera. Cameras are not typically recycled at the same facility that provides photofinishing, but instead are typically shipped to another facility before reuse. At intermediate stages, the cameras are commonly combined with cameras from other facilities and sorted by manufacturer and model.

Today's one-time-use cameras made by major manufacturers have the characteristic of being relatively rugged and capable of withstanding considerable abuse. For this reason, little effort is commonly taken to protect one-time-use cameras from rough handling during shipping, sorting, and other steps of the recycling process. As a result, cameras can become contaminated internally. Examples of typical contaminants are dirt or other particular matter picked up by a camera during use. A more insidious contaminant is small particles off plastic from broken cameras. Another is segments of tape and adhesive from the tape strips commonly used by non-manufacturer one-time-use camera reloaders.

Contaminants are particularly troublesome in the film space of a camera, that is, the area of the camera that is occupied by film when the camera is reloaded. A reason is that a small particulate or other contaminant can be trapped so as to cause a scratch or streak on the film of the camera during later use.

A known partial solution to this problem is to limit access to the film space after removal of the film cartridge from the one-time-use camera. Some cameras provide this by use of a film door that only opens the film cartridge chamber, rather than exposing the entire back of the camera. This solution is not a complete cure, since the cartridge chamber is exposed, as is the film gate between the cartridge chamber and the exposure chamber. Thus, contaminants can move into the cartridge chamber and from there into the remainder of the film space.

It would thus be desirable to provide an improved one-time-use camera and method in which the cartridge chamber and other portions of the film space are closed off from the exterior when a used film cartridge is removed.

SUMMARY OF THE INVENTION

The invention is defined by the claims. The invention, in its broader aspects, provides a one-time-use camera that has a body having a cartridge chamber and an opening at one end. A film transport is disposed in the body. The film transport has an advance element adjoining the cartridge chamber opposite the opening. A closure is disposed in the cartridge chamber. The closure is slidable along the cartridge chamber between a first position, in which the closure engages the advance element, and a second position, in which the closure closes the opening. After picture taking, a film door is moved away from the opening, a film cartridge is unloaded from the cartridge chamber, and the closure is moved to the second position closing the empty cartridge chamber.

It is an advantageous effect of the invention that an improved one-time-use camera and method are provided in which the cartridge chamber and other portions of the film space are closed off from the exterior when a used film cartridge is removed.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying figures wherein:

In FIG. 14a, the closure is in the first position and the film cartridge is in the loaded position. The film door is earlier removed from over the cartridge chamber opening and is therefore not shown. In FIG. 14b, the closure is in one of the intermediate positions between the first and second positions and the film cartridge is in a partially extended position. In FIG. 14c, the closure is in the second position and the film cartridge is in the removal position. In FIG. 14d, the closure is in the second position and the film cartridge is separated from the closure.

DETAILED DESCRIPTION OF THE INVENTION

Figure 1:
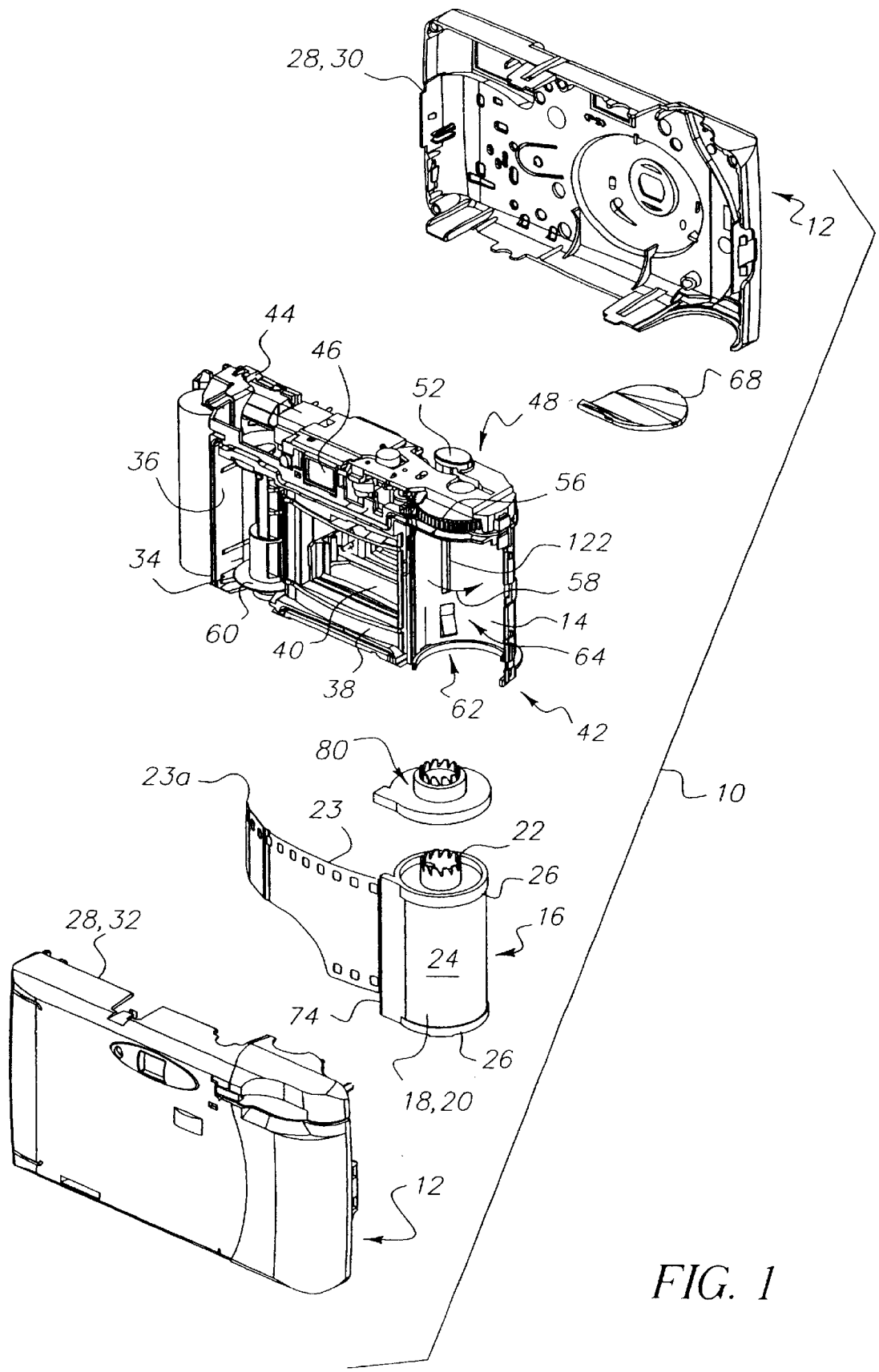
FIG. 1 is an exploded perspective view of an embodiment of the camera of the invention.

In the cameras and methods here, a closure is moved during removal of the film cartridge from a used one-time-use camera, into a position that closes all of the film space from the outside environment. As a result, contaminants are blocked from entry. The camera 10 has a body 12, which includes a cartridge chamber 14. A film unit 16 is disposed in the cartridge chamber 14. The invention is generally discussed herein in relation to cameras having the features of commonly marketed one-time-use cameras. For example, the film units 16 discussed herein each have a holder 18 that provides a single light-tight film chamber. The one chambered holder or patrone 18 has a canister 20 holding an internal spool 22 to which a filmstrip 23 is attached. The canister 20 has a surround 24 that extends around the film spool 22 and a pair of opposed end caps 26 that are attached to the surround 24. Other types of film units can also be used, for example, film units that have a two chambered holder or film units that have a holder that consists only of a spool and light-tight backing material covering the filmstrip (not illustrated). Other features of the cameras can likewise be varied.

Figure 2:
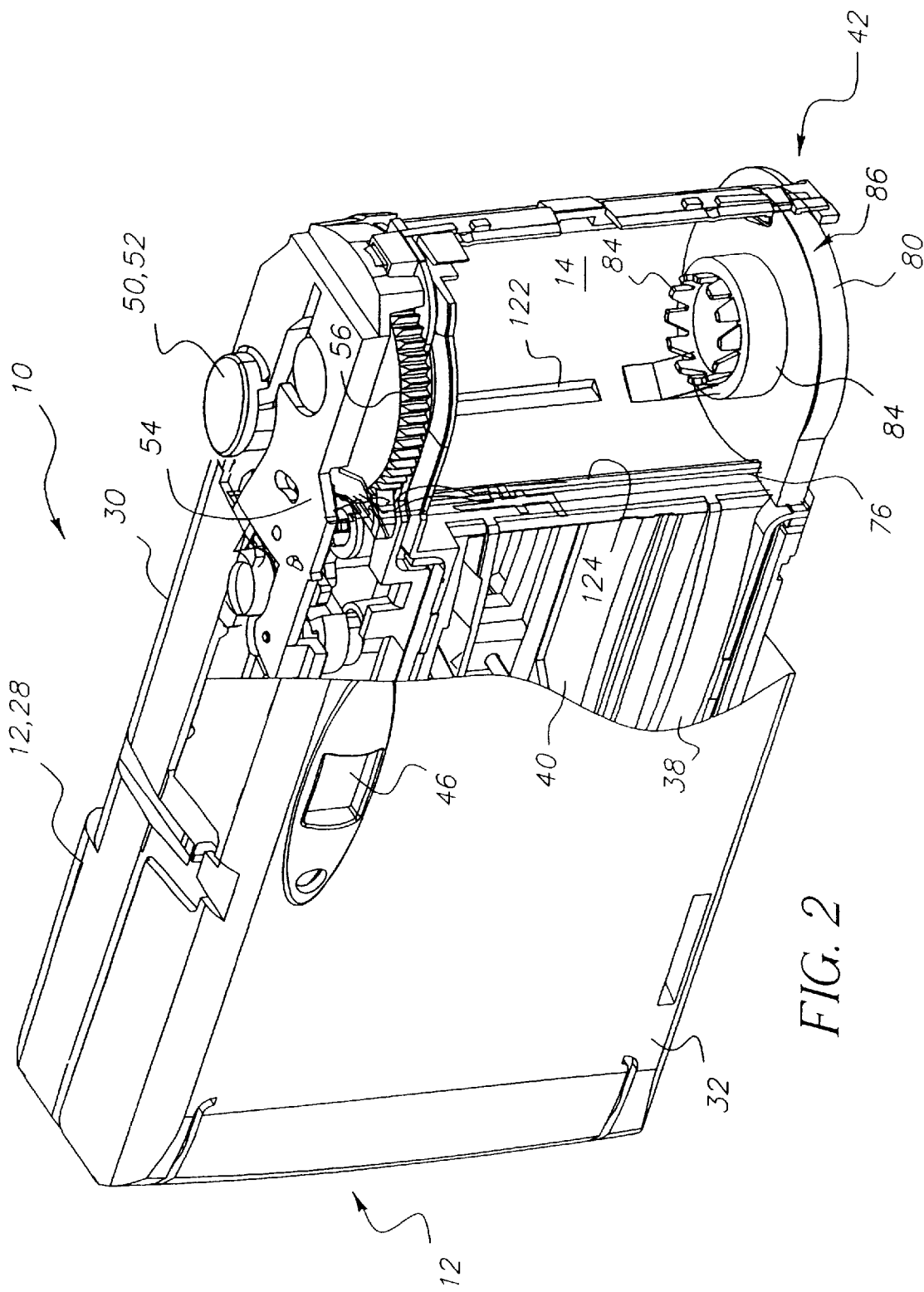
FIG. 2 is a rear perspective view of the camera of FIG. 1, partially cut away to show parts of the film space. The closure is shown in the second or sealing position.

Referring now primarily to FIGS. 1–2, the body 12 of the camera 10 has a shell 28 made up of a front cover 30 and a rear cover 32 and has a frame or chassis 34 mounted between the covers 30,32. In a particular embodiment of the camera 10, the front and rear covers 30,32 are each a one-piece plastic casting. The front and rear covers 30,32 are joined together and generally surround the frame 34. The frame 34 is a single or multiple piece plastic casting. The frame 34 includes the cartridge chamber 14 and has an opposed supply chamber 36. Between the cartridge and supply chambers 14,36 is an exposure chamber or backframe 38 and forward from that is a light baffle 40. Mounted to the frame 34 are the various components of the camera systems. The combination of the frame 34 and one or more components mounted to the frame 34 is referred to herein as a "frame assembly 42".

The frame assembly 42 includes a flash unit 44, a viewfinder 46, and an exposure system 48. The exposure system 48 includes a shutter-and-lens unit 50. When a shutter release 52 of the shutter-and-lens unit 50 is tripped, light passes through a lens system (not shown) and through the baffle 40 to a frame of the film 23 held in the exposure chamber 38.

The exposure system 48 includes a film transport 54 that has an advance element 56. The advance element 56 shown in the figures is a one-piece thumbwheel that is rotated in the direction indicated by arrow 58 to rotate the spool 22 of the film cartridge 16 and advance the film 23 on a frame-by-frame basis from the supply chamber 36 into the cartridge chamber 14 and then back into the film cartridge 16. As this indicates, the film 23 is prewound before use and is exposed on rewind. The advance element 56 is not limited to a thumbwheel and, for example, can instead have an advance lever mechanism in place of a thumbwheel.

The exposure system 48 includes a metering mechanism (not illustrated) that meters film advance for each frame of the film 23. Rotation of the advance element 56 drives the metering mechanism and charges a spring-action shutter (not illustrated), in addition to advancing the film 23. Rotation of the advance element 56 is limited to a single direction by a one-way clutch (not illustrated). Prior to use, a main portion of the filmstrip 23 is held as a film roll in the supply chamber 36. The film roll can be wound on a supply spool 60 or can be in the form of a spoolless coil.

Figure 14:
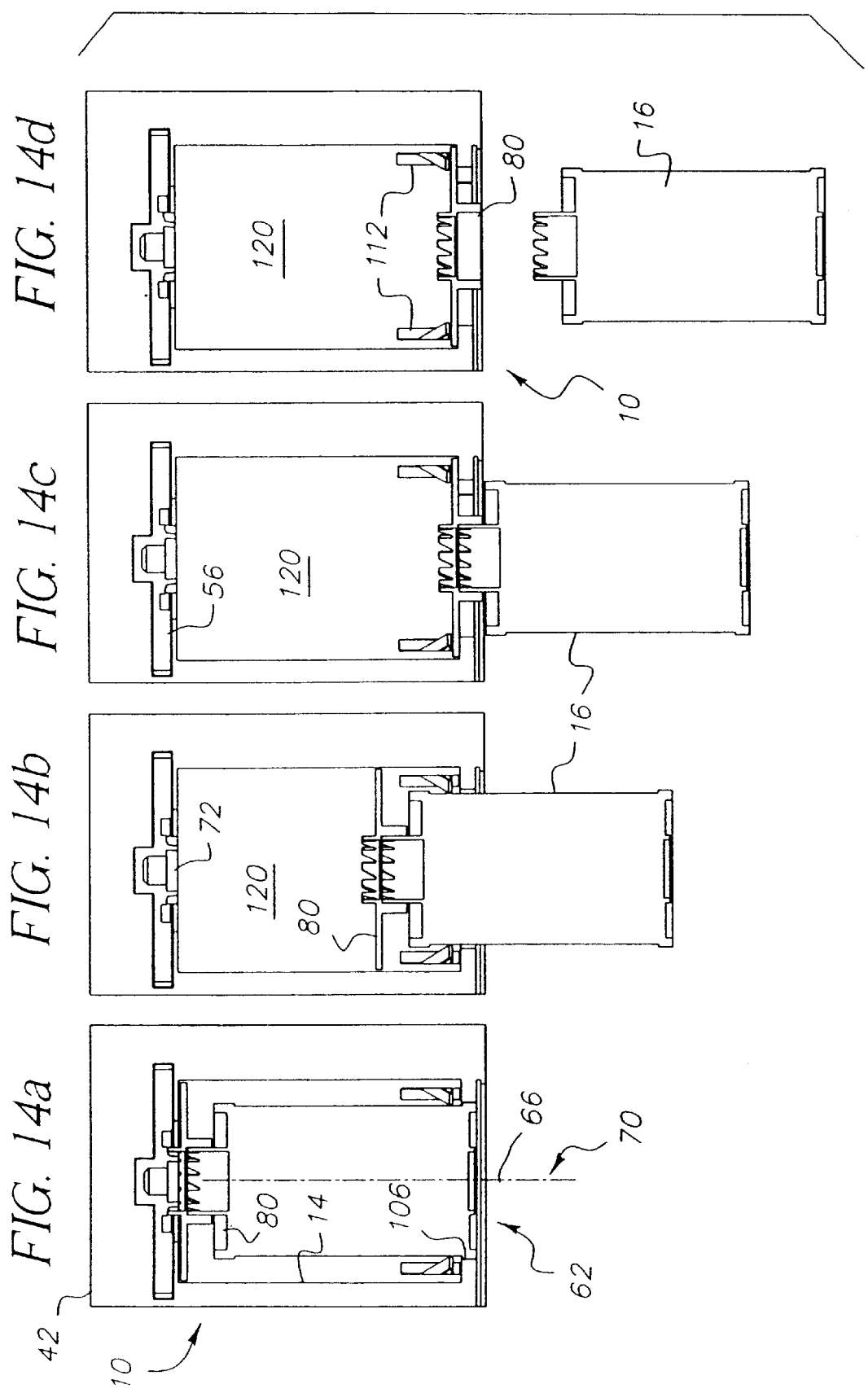
FIGS. 14a–14d are diagrammatical views showing removal of a film cartridge from the cartridge chamber of another embodiment of the camera.
Figure 16A:
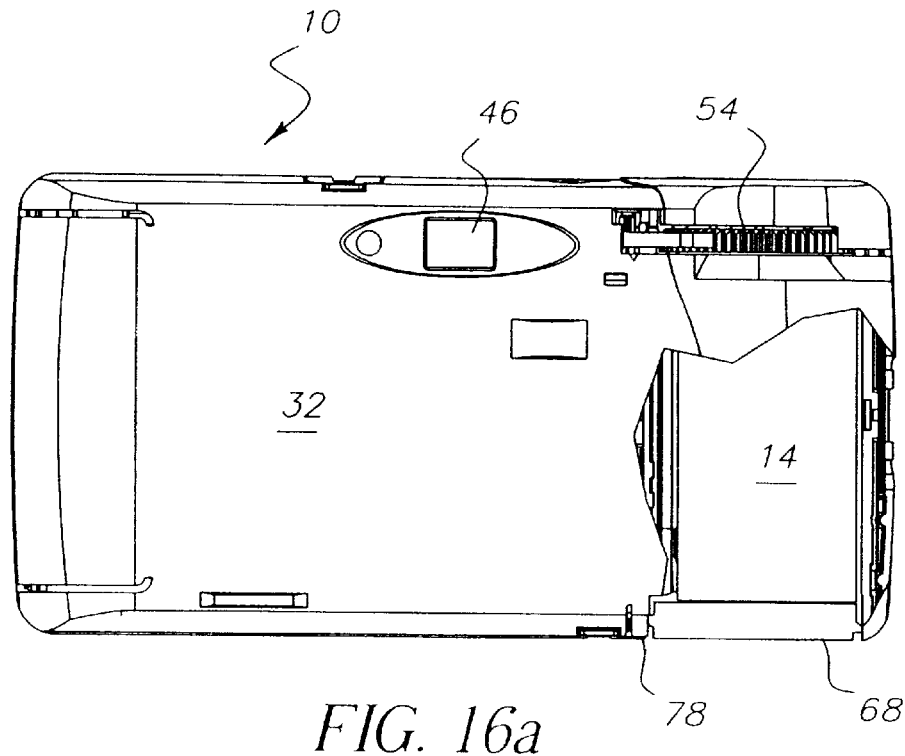
FIG. 16a is a partially cut-away rear view of the camera of FIG. 1. The film door is shown in a closed position blocking the opening of the film cartridge chamber.
Figure 16B:
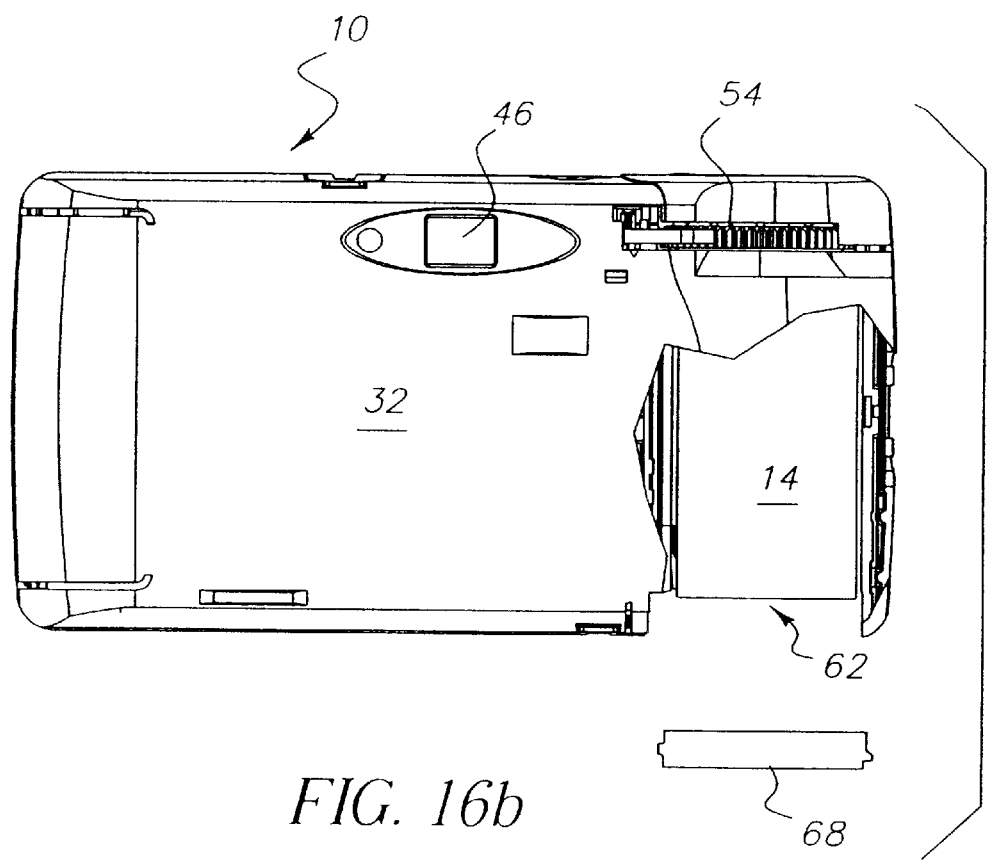
FIG. 16b is the same view as FIG. 16a, except that the film door is detached from the camera.
Figure 17A:
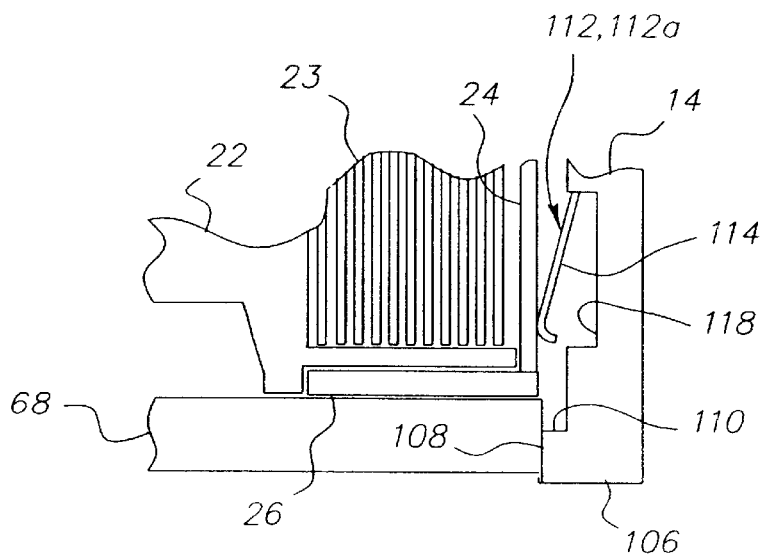
FIG. 17a is a partial cross-sectional view of the camera of FIG. 15. Part of the cartridge chamber, film door, and film cartridge are shown. The film cartridge is in the loaded position.
Figure 17B:
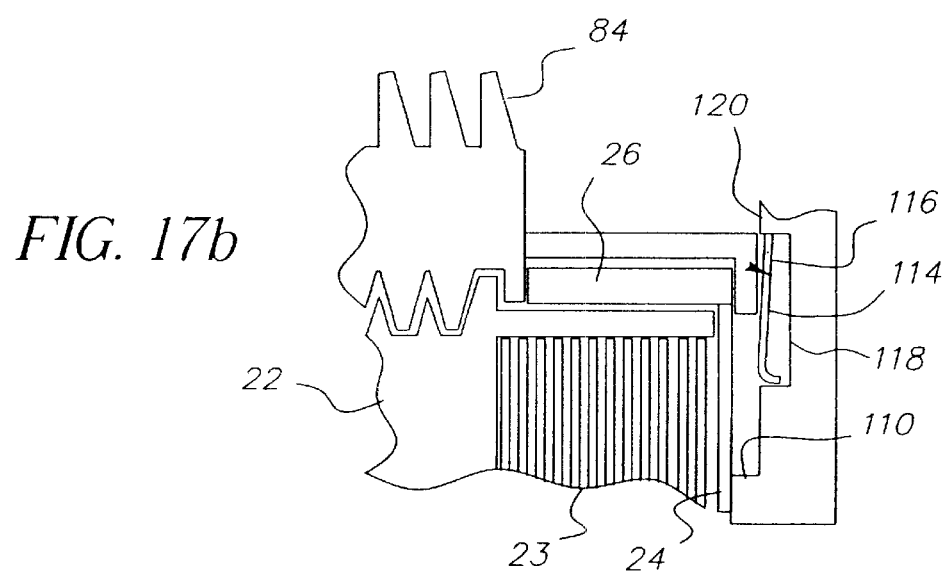
FIG. 17b is the same view as FIG. 17a, but the film door is removed and the film cartridge is shown in an intermediate position occupied during unloading. The closure is shown in an intermediate position in which the cover bears on a clip.
Figure 17C:
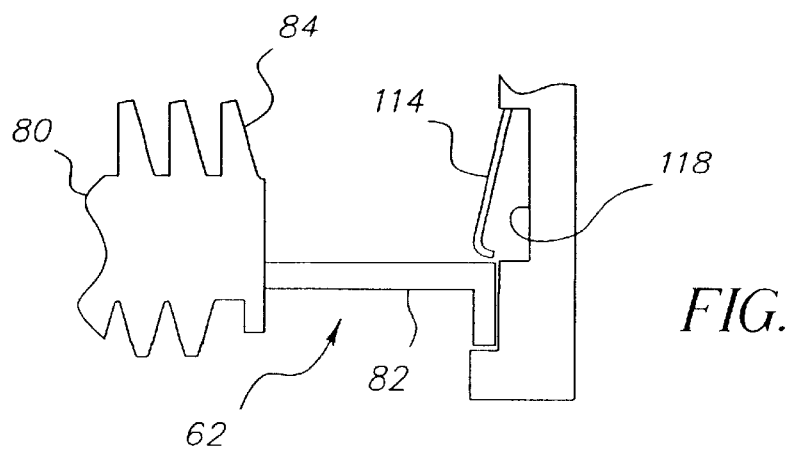
FIG. 17c is the same view as FIG. 17b, but the closure is in the second position and the film cartridge is detached from the closure.

The opening 62 of the cartridge chamber 14 is at one end opposite the advance element 56. Between the two ends, the cartridge chamber 14 defines a cylindrical cartridge space 64 having an axis 66 perpendicular to a plane through the optical axis of the lens system. (The axis 66 is shown in FIG. 14a. The drawing surface defines the plane through the optical axis.) The cylindrical cartridge space 64 can be circular or non-circular in cross-section depending upon the shape of the film cartridge 16. Other than a film door 68 (shown in FIG. 1 and FIGS. 16a–16b), camera features do not underlie the cartridge chamber 14. Thus, when the film door 68 is moved away from the opening 62 of the cartridge chamber 14, an empty area 70 (indicated in FIG. 14a) is defined that extends outward from the cartridge chamber 14 as a cylindrical extension of the cartridge space 64. As illustrated in FIGS. 14a–14d, this extension of the cartridge space 64 provides clearance for removal of the film cartridge 16.

The advance element 56 has a hub 72 that faces the opening 62 and adjoins the cartridge space 64. The hubs 72 shown in the figures are recessed outward from the cartridge chamber 14. The hub 72 can instead protrude into the cartridge chamber 14, if desired.

Commonly available film cartridges have a laterally directed stem 74 that protrudes relative to the remainder of the cartridge and provides a portal for entry and exit of the filmstrip 23. The frame 34 of the camera 10 has a shelf 76 or the like, that receives the stem 74 so as to hold the film exit adjacent the exposure chamber 38 and arrest rotation of the cartridge about the cartridge chamber axis 66.

The film door 68 blocks the opening 62 of the cartridge chamber 14 and is openable for cartridge unloading. The characteristics of the film door 68 are otherwise not critical. For example, the film door 68 shown in FIG. 1 is molded as a part of one of the covers 30,32 of the camera body 12. This film door 68 is pried open using a tool, such as a screwdriver. The film door 68 initially bends at a line of reduced thickness 78 and then breaks free of the remainder of the respective cover. The film door 68 can alternatively remain attached and just bend out of the way at a hinge formed by a line of reduced thickness, or the like.

The camera 10 has a closure 80 located between the advance element 56 and the opening 62 of the cartridge chamber 14. The closure 80 has a cover 82 and a coupling 84. The coupling 84 is central to the cover 82 and defines a coupling axis 66. (Axes of the coupling 84, advance element 56, cartridge chamber 14, and cartridge spool 22 when loaded, are all the same in the illustrated embodiments and the same reference numeral is used.) In these and other embodiments, the coupling axis 66 is aligned with (and preferably coextensive with) the other axes.

Figure 12:
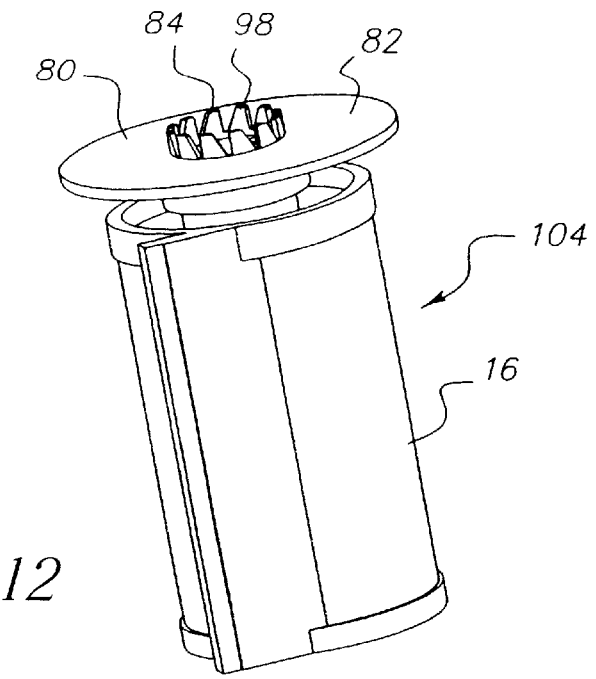
FIG. 12 is a top perspective view of another modified closure, fitted to a Type 135 (35 mm) film cartridge.
Figure 13:
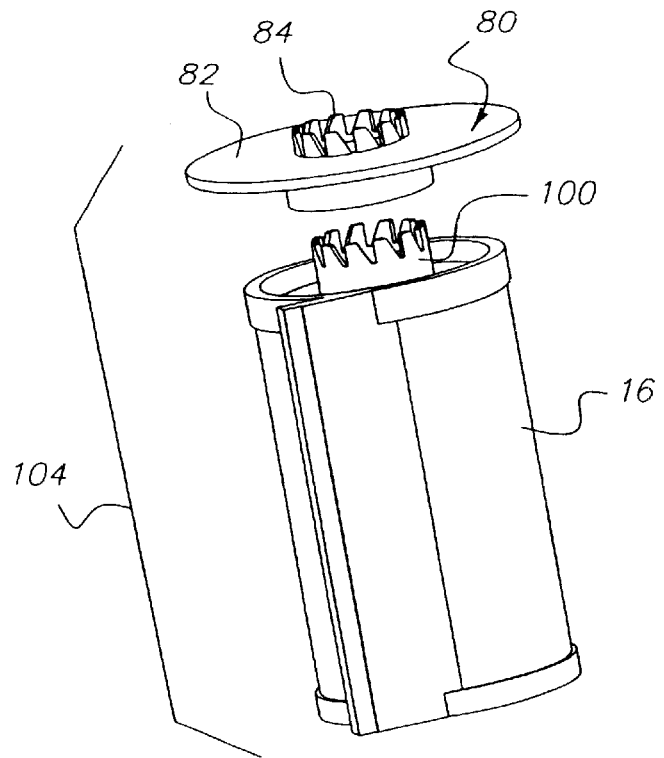
FIG. 13 is the same view as FIG. 12, but with the closure and film cartridge separated.

The cover 82 has a periphery 86 that matches the cross-section of the cartridge space 64. The coupling 84 is rotated about the coupling axis 66 during film winding. The cover 82 can rotate with the coupling 84, as in the embodiment shown in FIG. 12, or the coupling 84 can rotate independent of the cover 82.

In the former case, the coupling 84 can be of one-piece with the cover 82. For example, the coupling 84 can be a single polymer casting. The periphery 86 of the cover 82 has a cross-sectional shape that allows the cover 82 to rotate within the cartridge chamber 14. A periphery 86 of a circular shape is convenient for this purpose.

Figure 3:
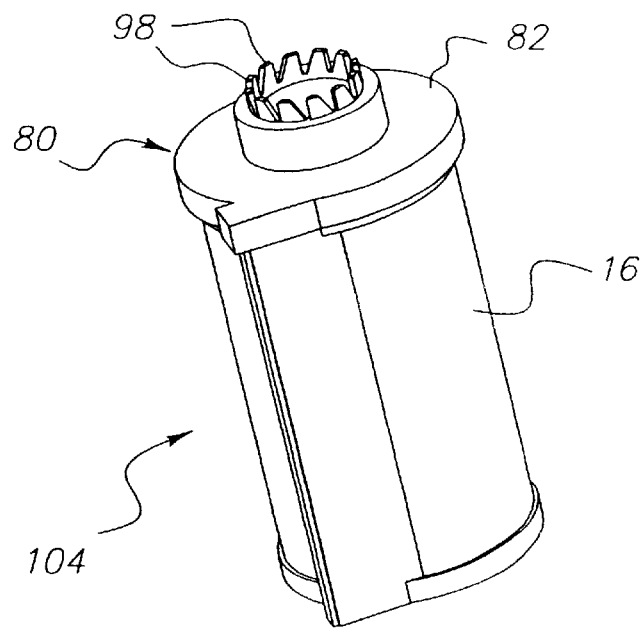
FIG. 3 is a top perspective view of the closure of the camera of FIG. 1, fitted to a film cartridge.
Figure 4:
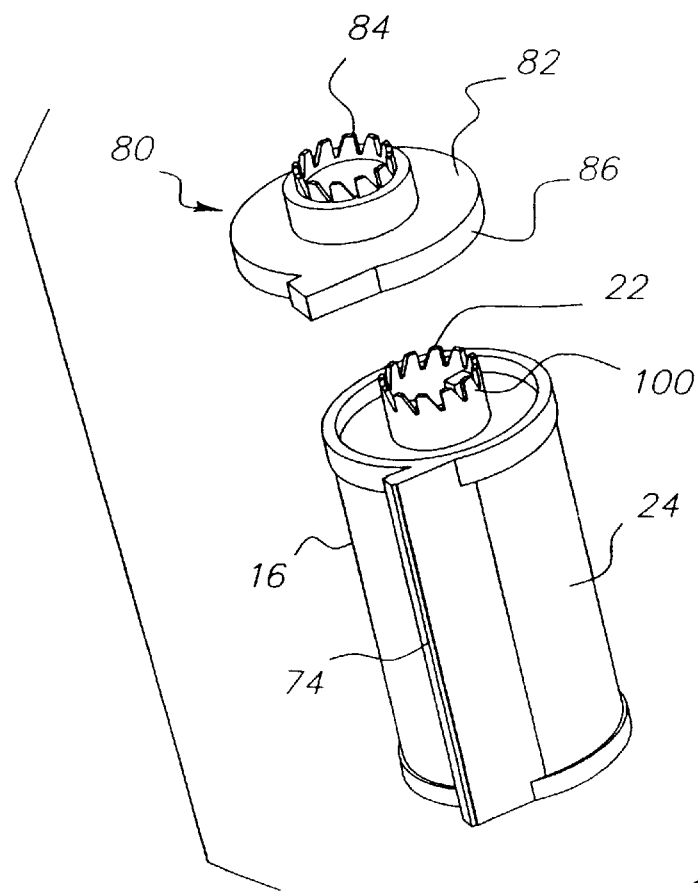
FIG. 4 is the same view as FIG. 3, but with the closure and film cartridge separated.
Figure 5:
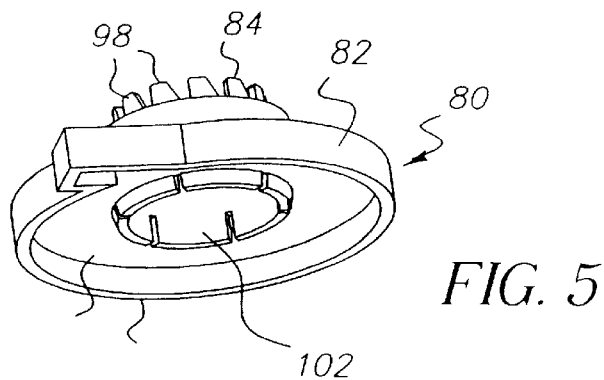
FIG. 5 is a bottom perspective view of the closure of the camera of FIG. 1.
Figure 6:
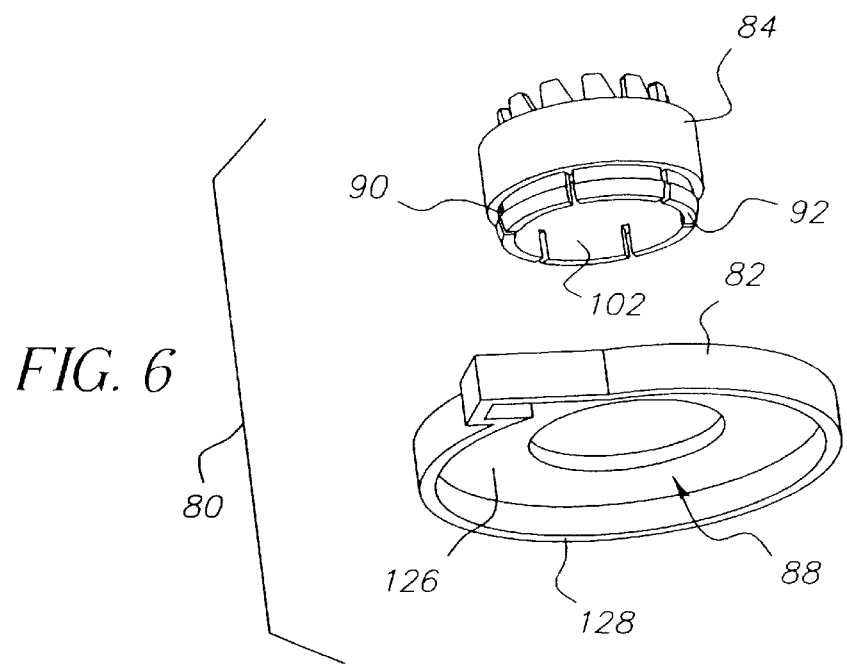
FIG. 6 is the same view as FIG. 5, but with the cover and coupling of the closure separated.
Figure 7:
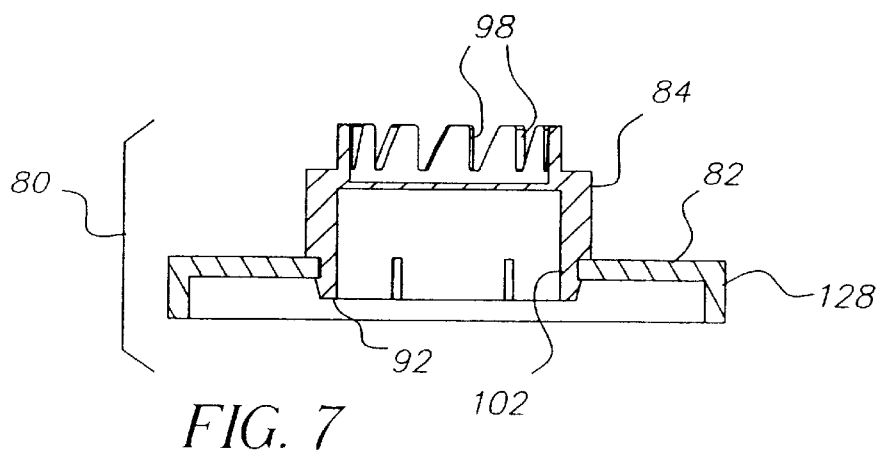
FIG. 7 is a cross-sectional view of the closure of FIG. 1.

With a two-piece cover 82 and coupling 84, as shown in FIG. 3, the coupling 84 is rotatably mounted within a central hole 88 in the cover 82. Referring to FIGS. 5–7, this can be conveniently provided by use of a cover 82 that is snap fitted in an external groove 90 of the coupling 84. For better snap fitting, the bottom margin 92 of the coupling 84 can be notched and one or both of the cover 82 and coupling 84 can be flexible. The groove 90 is sized to allow free rotation of the coupling 84 relative to the cover 82. In this case, rotation of the cover 82 during film winding is blocked by interference with part of the cartridge chamber 14, such as the shelf 76.

Figure 15:
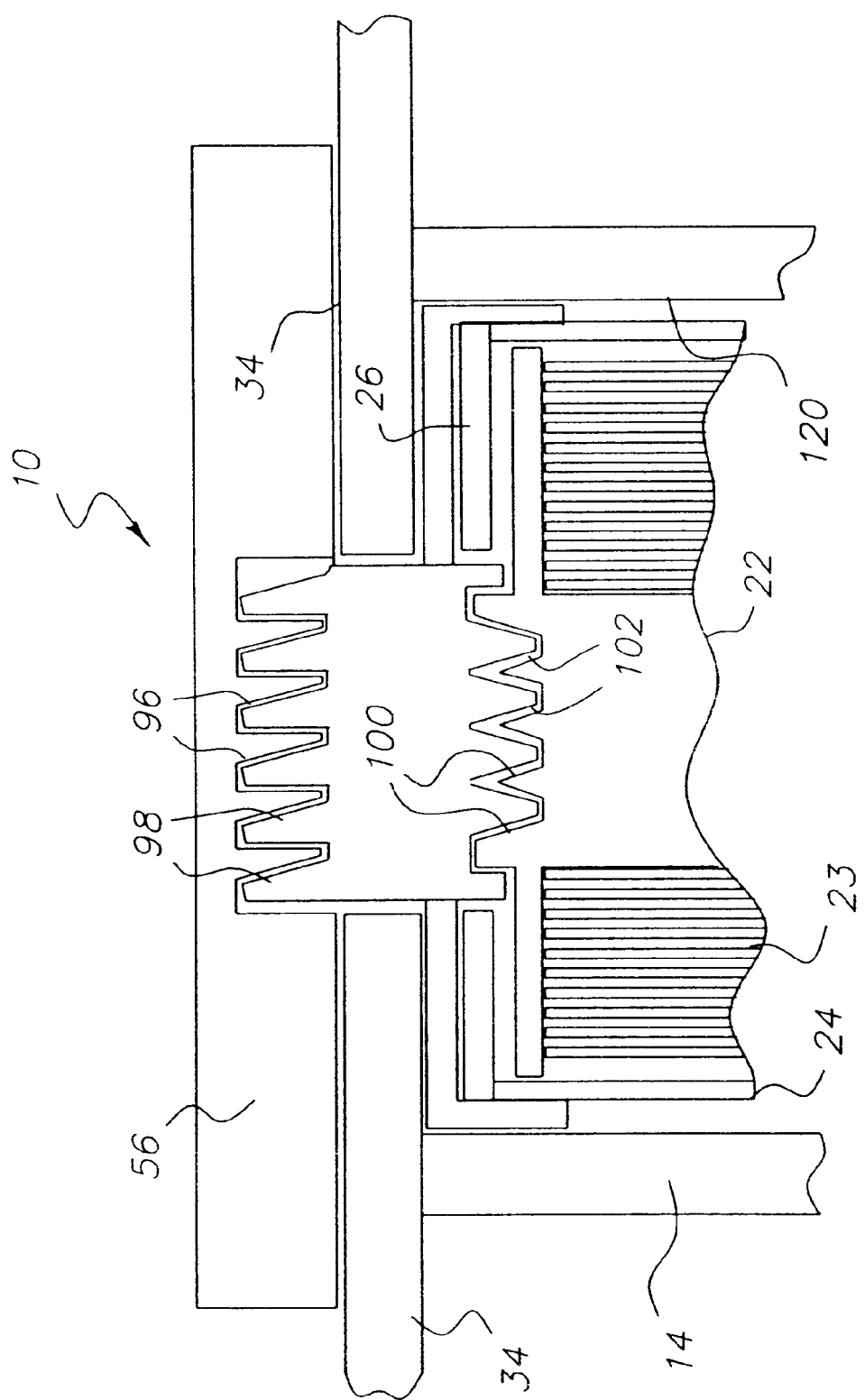
FIG. 15 is a partial cross-sectional view of another embodiment of the camera. The advance element and a part of the cartridge chamber are shown along with the closure and part of the film cartridge.

When a film cartridge 16 is loaded in the cartridge chamber 14, the closure 80 is in a first position in engagement with a hub 72 of the advance element 56. (This is best seen in FIGS. 14a and 15.) The closure 80 is also in engagement with the film cartridge 16.

The hub 72 and the coupling 84 each have complementary contact surfaces 96,98, respectively. (Best seen in FIG. 15.) The contact surfaces 96,98 are each radially offset from the axes of rotation of the advance element 56 and coupling 84 to reduce the possibility of slippage. The contact surfaces 96,98 are aligned along the axes, when the closure 80 is in the first position, such that the contact surfaces 96,98 are in engagement and rotation of the advance element 56 causes the coupling 84 to rotate. The contact surfaces 96,98 shown in the figures are shaped like contacting portions of teeth of the coupling and hub. Other shapes of contact surfaces can also be used.

The spool 22 of the film cartridge 16 and the coupling 84 have complementary engagement surfaces 100,102, respectively, which are tightly engaged when the film cartridge 16 is in a loaded position in the cartridge chamber 14. The tight engagement of the engagement surfaces 100,102 of the spool 22 and coupling 84 can be provided by a force fit between the engagement surfaces 100,102 of the spool 22 and the coupling 84, respectively. (The term "force fit" is used here to refer to a relative sizing of engaged portions of parts that results in a relatively high degree of friction and force required when an effort is made to separate the respective parts. The term "force fit" is also inclusive of an interference fit in which one or both parts flex when the parts are fitted together and some of the force required to separate the parts is used to overcome internal resilience of one or both parts.) The spool 22 of the film cartridge 16 and the coupling 84 can alternatively be held together by other means than a force fit. For example, the spool 22 and coupling 84 can be held together by engagement surfaces 100,102 in the form of fittings or fasteners (not illustrated), such as complementary threads that are screwed together or a bayonet mount. Similarly, a releasable adhesive layer (not illustrated) can be provided between the spool 22 and the coupling 84. The spool 22 and coupling 84 can be made as a one-piece part with a line of weakness (not illustrated) joining together the engagement surfaces 100,102. In this case, the spool 22 and coupling 84 are separated by breaking them apart at the line of weakness.

Figure 8:
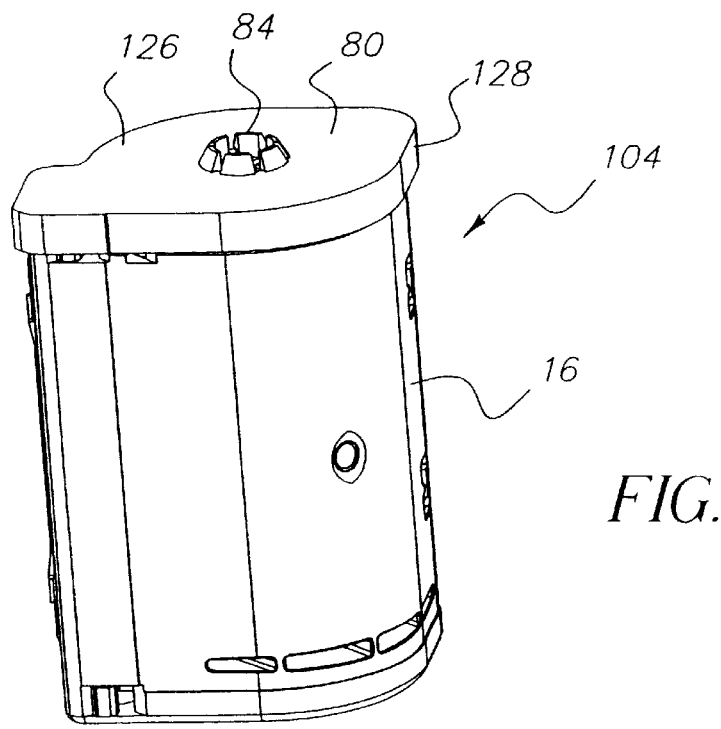
FIG. 8 is a top perspective view of a modified closure, fitted to an Advance Photo System™ ("APS") film cartridge.
Figure 9:
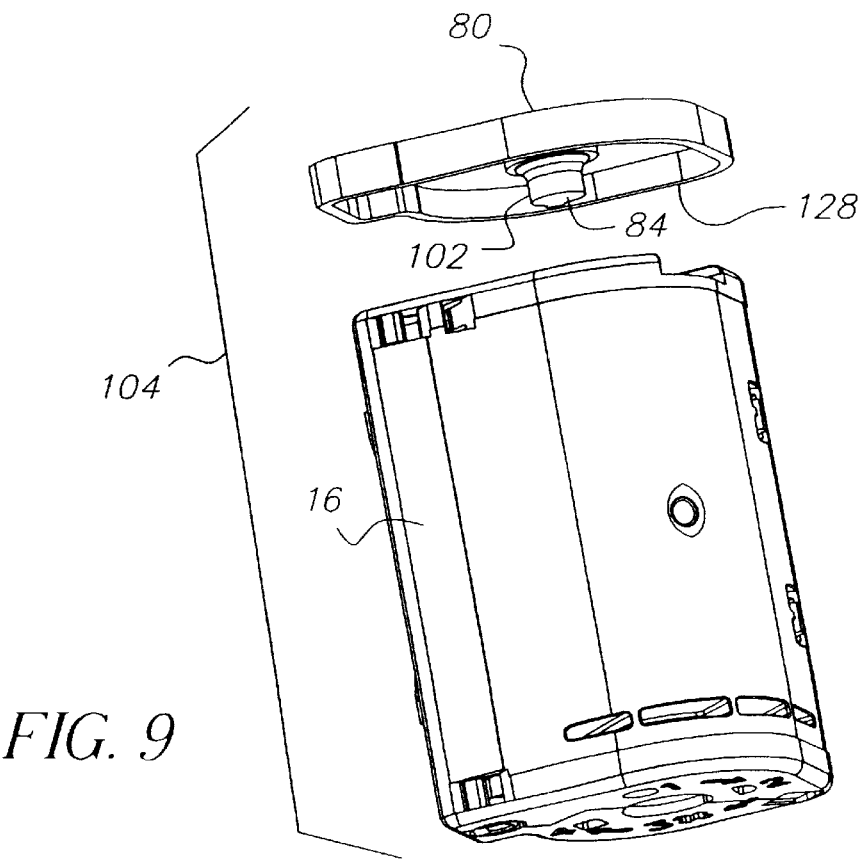
FIG. 9 is the same view as FIG. 8, but with the closure and film cartridge separated.
Figure 10:
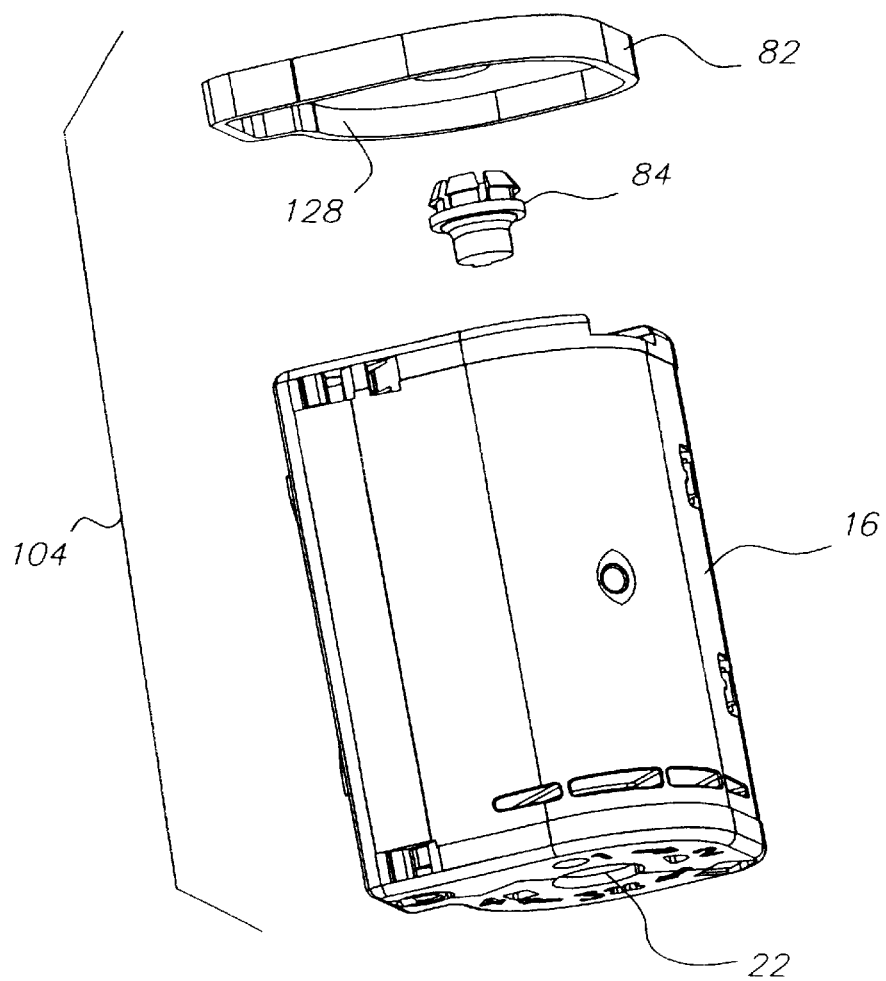
FIG. 10 is the same view as FIG. 9, but the cover and coupling of the closure are also separated.
Figure 11:
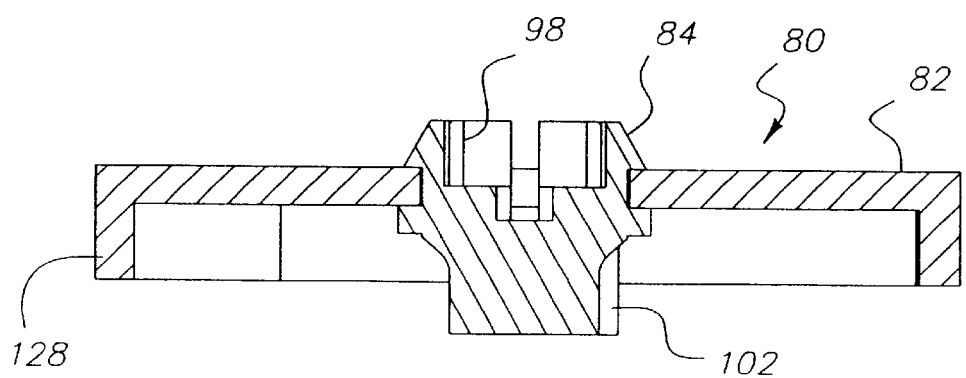
FIG. 11 is a cross-sectional view of the closure of FIG. 8.

The closure 80 is freely movable along the cartridge chamber 14 parallel to the axis of rotation of the film cartridge spool 22 from the first position toward the opening 62 of the cartridge chamber 14. The respective configurations of the hub 72 and coupling 84 are such that movement of the closure 80 from the first position toward the opening 62 of the cartridge chamber 14 separates the contact surfaces 96,98 of the hub 72 and coupling 84. In preferred embodiments, there is no overlap of contact surfaces 98 of the coupling 84 and any parts of the advance element 56. This allows a separation of the closure 80 from the advance element 56 without requiring a rotation of the closure 80 relative to the advance element 56. FIG. 15 illustrates an example of configurations of the closure 80 and advance element 56 having this characteristic. In contrast, an undesirable configuration would be reciprocal threads (not illustrated), since this would require rotation of the closure 80 for movement along the cartridge chamber 14 with the embodiments shown in FIGS. 3 and 8, rotation of the closure 80 is precluded. With the embodiment shown in FIG. 12 rotation could be allowed, but is very undesirable since there would be a risk of jamming.

Although the closure 80 and advance element 56 are freely separable, the closure 80 and film cartridge 16 are tightly engaged. The closure 80 and film cartridge 16, thus, have a propensity to move along the cartridge chamber 14 as a single unit. (The closure 80 and film cartridge 16 are referred to collectively here as the closure-cartridge unit 104.)

Once the film door 68 is opened, the film cartridge 16 can be unloaded. The filmstrip 23 is earlier wound into the film cartridge 16. The filmstrip 23 can be completely wound into the film cartridge 16 or a tab 23a of the filmstrip 23 can be allowed to protrude, if the cylindrical cartridge space 64 is appropriately shaped to provide the needed clearance. This assumes that the film cartridge 16 is Type 135 or the like, in which the filmstrip can slightly protrude without loss of light-tightness. If the film cartridge 16 is an APS cartridge or the like, in which a pivotable light lock (not illustrated) is used to provide a light type tight seal, then the light lock must be closed prior to film cartridge removal or else the cartridge must be removed in the dark.

When the film door 68 is closed, that is, in place blocking the opening 62 of the film cartridge chamber 14, the film cartridge 16 is held within the film cartridge chamber 14. The loaded film cartridge 16 is tightly secured to the closure 80 and holds the closure 80 in engagement with the advance element 56. When the film door 68 is removed, the closure 80 and film cartridge 16 together, that is, the closure-cartridge unit 104, can freely move within the cartridge chamber 14. In the embodiments illustrated, the opening 62 of the cartridge chamber 14 is at the bottom of the camera body 12 and downward movement of the closure-cartridge unit 104 is assisted by gravity when the film door 68 is removed and the camera 10 is held in an upright or normal position. (The terms "upward" and "downward" and like terms, used herein are relative to this position of the camera 10.)

Referring now particularly to FIGS. 14a–14d, when the closure-cartridge unit 104 is unloaded, the closure-cartridge unit 104 moves from the first position shown in FIG. 14a, through a series of intermediate positions, to a second position shown in FIG. 14c. In the embodiments illustrated, the closure 80 is trapped within the cartridge chamber 14 and the first position and second position define limits of movement of the closure 80. One of the intermediate positions is shown in FIG. 14d. The first position has been discussed, the closure 80 is in engagement with the advance element 56.

The closure-cartridge unit 104 is freely slideable along the cartridge chamber 14 between the first position and the intermediate positions and between the various intermediate positions. Downward movement is assisted by gravity, but upward movement between the intermediate positions is not constrained. The opening 62 can be shaped so as to allow the user to grip and pull the cartridge or gravity alone (and the user shaking the camera) can be relied upon for cartridge removal.

Referring now primarily to FIG. 14c, below the intermediate positions is the second position. The film cartridge chamber 14 has a brim 106 that surrounds the opening 62. In the second position, the closure 80 is disposed in light lock relation to the brim 106, so as to block foreign matter from entering the cartridge chamber 14 through the opening 62 of the cartridge chamber 14. The cover 82 of the closure 80 and the brim 106 of the cartridge chamber 14 are configured so as to achieve this result. In the embodiment illustrated in FIGS. 14a–14d, the cover 82 is circular in cross-section perpendicular to the chamber axis 66. The brim 106 has a circular inner edge 108 and has an annular seat 110 that adjoins the inner edge 108 and faces the advance element 56. The opening 62 of the cartridge chamber 14 is defined by the inner edge 108 and has a radius that is less than the radius of the closure 80 in the same direction. It is preferred that adjoining surfaces 112,114 of the closure 80 and brim 106 closely meet when the closure 80 is in the second position, so as to seal the opening 62 against small particles.

It is highly preferred that an anti-backup 112 is provided to hold the closure 80 in the second position, in other words, to lock the closure 80 in place closing the opening 62 of the cartridge chamber 14. Different types of anti-backup 112 can be used. For example, the closure 80 can be adhered to the brim 106 by a layer of pressure sensitive adhesive (not shown). A convenient example of mechanical means is a one-way latch 112a, such as the one illustrated in FIGS. 14a–14d and FIGS. 17a–17c. The one-way latch 112a has a pair of flexible spring clips 114 that have one end 116 held in a recess 118 in the circumferential wall 120 of the cartridge chamber 14. The clips 114 are angled inward and downward toward the opening 62 of the cartridge chamber 14. The clips 114 are resiliently biased inward toward the chamber axis 66. (This biasing is internal in the clips 114 shown. External biasing using separate springs can be provided in a like manner.) The clips 114 bear lightly against the cartridge 16 when the closure-cartridge unit 104 is in the first position or some of the intermediate positions. The clips 114 are pushed back into respective recesses 118 when the closure 80 is moved past and into the second position. The clips 114 snap back inward (toward the axis 66) when the closure 80 has moved past, to lock the closure 80 in place and block motion of the closure 80 out of the second position.

The cartridge chamber 14 is configured so to be spaced from the cartridge 16 during movement of the closure-cartridge unit 104. All or most of the wall 120 of the cartridge chamber 14 can closely contact the closure 80 during movement. It is preferred, however, that the surface area of the cartridge chamber 14 in contact with the closure-cartridge unit 104 be a small fraction of the total wall area. This reduces friction to allow easier movement. In the embodiment of the camera 10 shown in FIG. 1, a protrusion 122 extends longitudinally along the wall 120 of the cartridge chamber 14 and the cartridge rides against this protrusion 122. Additional protrusions 122 can be provided, or the wall can be dished out in places to achieve the same effect. The protrusion 122 shown is continuous. Discontinuous protrusions can be provided in a like manner.

It is preferred that the cartridge chamber 14 has at least one guide surface 124, extending longitudinally parallel to the axis 66, that blocks pivoting of the closure 80 about the axis 66 and pivoting of the closure 80 about another axis (not shown) perpendicular to the spool axis 66. Such pivoting could otherwise present a risk of jamming of the closure-cartridge unit 104 within the cartridge chamber 14. In the embodiment shown in FIG. 1, the guide surface 124 is part of the shelf 76. Other guide surfaces can be provided as needed.

The closure 80 can be cap-shaped with a radially extending main portion 126 and an axially extending peripheral wall 128. In this case, the cover 82 can engage the canister 20 of the film cartridge 16, with the end of the canister held by the cap formed by the main portion 126 and wall 128. This engagement can be tight so that the cover 82 and coupling 84 both act to hold the closure-cartridge unit 104 together. Alternatively, the cover 82 can fit loosely on the canister 20. Such covers contrast with the embodiment shown in FIG. 12, in which the closure 80 is spaced from the canister 20, while the closure 80 is part of the closure-cartridge unit 104. The closure 80, in this case, can be made in one piece, since the canister 20 does not interfere with rotation.

Referring now particularly to FIGS. 14c and 14d, when the closure-cartridge unit 104 reaches the second position, the film cartridge 16 reaches the removal position and remains tightly engaged with the closure 80. The film cartridge 16 is then decoupled from the closure 80, the film cartridge 16 can be submitted for film processing, and the unloaded camera 10 recycled. During recycling, the back cover 82 is removed from the camera 10. This releases the closure 80, which is removed from the second position in the cartridge chamber 14. The closure 80, or one like it, is reinstalled in the cartridge chamber 14 during reloading and reassembly.

The invention has been described in detail with particular reference to certain preferred embodiments thereof, but it will be understood that variations and modifications can be effected within the spirit and scope of the invention.

What is claimed is:

1. A one-time-use camera comprising:

a body having a cartridge chamber having an opening at one end;

a film transport disposed in said body, said film transport having an advance element adjoining said cartridge chamber opposite said opening;

a closure disposed in said cartridge chamber, said closure being slidable along said cartridge chamber between a first position wherein said closure engages said advance element, and a second position wherein said closure closes said opening.

2. The camera of claim 1 wherein said closure is trapped in said cartridge chamber.

3. The camera of claim 2 wherein said body has a removable door closing said opening.

4. The camera of claim 1 further comprising a film cartridge disposed in said cartridge chamber, said film cartridge tightly engaging said closure, said film cartridge being movable with said closure from a loaded position, wherein said film cartridge is disposed internal to said cartridge chamber and said closure is in said first position, to a removal position wherein said film cartridge is disposed external to said cartridge chamber and said closure is in said second position.

5. The camera of claim 4 wherein said closure has a cover and a coupling central to said cover, said spool and said coupling having complementary engagement surfaces, said engagement surfaces being engaged when said film cartridge is in said loaded position and in said removal position.

6. The camera of claim 5 further comprising a film cartridge disposed in said cartridge chamber, said film cartridge having a rotatable spool and a filmstrip wound around said spool, said spool being in force fit relation to said coupling.

7. The camera of claim 4 wherein said closure has a cover and a coupling rotatably mounted to said cover.

8. The camera of claim 7 wherein said film cartridge has a canister extending around said film spool and said cover of said closure is in engagement with said canister.

9. The camera of claim 1 wherein said closure has a cover and a coupling rotatably mounted to said cover.

10. The camera of claim 1 wherein said closure is of one-piece.

11. The camera of claim 1 wherein said cartridge chamber has a brim adjoining said opening, said brim receiving said closure when said closure is in said second position.

12. The camera of claim 1 further comprising an anti-backup mounted to said cartridge chamber, said anti-backup allowing movement of said closure from said first position to said second position, said anti-backup preventing movement of said closure from said second position to said first position.

13. The camera of claim 1 further comprising a one-way latch mounted to said cartridge chamber, said one-way latch allowing movement of said closure from said first position to said second position, said one-way latch blocking movement of said closure from said second position to said first position.

14. A one-time-use camera comprising:
a body having a cartridge chamber having an opening at one end;
a film transport disposed in said body, said film transport having an advance element adjoining said cartridge chamber opposite said opening; and
a closure disposed in a first position within said cartridge chamber, said closure, in said first position, engaging said advance element, said closure being slideable along said cartridge chamber from said first position to a second position wherein said closure closes said opening.

15. The camera of claim 14 further comprising a film cartridge disposed in said cartridge chamber, said film cartridge having a rotatable spool and a filmstrip wound around said spool, said spool tightly engaging said closure.

16. The camera of claim 15 wherein said body has a film door closing said opening of said cartridge chamber, said film door holding said film cartridge in said cartridge chamber and said closure in engagement with said advance element.

17. The camera of claim 15 wherein said closure has a cover and a coupling rotatably mounted to said cover, and said coupling loosely engages said advance element and tightly engages said spool.

18. The camera of claim 14 further comprising a one-way latch mounted to said cartridge chamber, said one-way latch allowing movement of said closure from said first position to said second position, said one-way latch blocking movement of said closure from said second position to said first position.

19. A one-time-use camera for use with a film unit, said camera comprising:

a body having a cartridge chamber having an opening at one end, said cartridge chamber defining an empty cartridge space sized to receive said film cartridge;
an advance element adjoining said cartridge chamber opposite said opening, said advance element having a hub facing said opening; and
a closure held within said cartridge chamber at said opening, said closure and said hub having complementary contact surfaces.

20. The camera of claim 19 further comprising a one-way latch blocking movement of said closure away from said opening.

21. A method of preparing one-time-use cameras for recycling, comprising the steps of:
moving a film door away from an opening of a cartridge chamber of the camera;
unloading a film cartridge from said cartridge chamber;
closing said cartridge chamber; and
retaining said cartridge chamber closed and said film door away from said opening;
wherein said closing further comprises moving a closure from a first position within said cartridge chamber into said opening and said closure, in said first position, engages an advance element of said camera.

22. The method of claim 21 wherein said closing is concurrent with said unloading.

23. A method of preparing one-time-use cameras for recycling, comprising the steps of:
moving a film door away from an opening of a cartridge chamber of the camera;
unloading a film cartridge from said cartridge chamber;
closing said cartridge chamber; and
retaining said cartridge chamber closed and said film door away from said opening;
wherein said closing further comprises moving a closure from a first position within said cartridge chamber into said opening and said retaining further comprises blocking movement of said closure toward said first position.

24. The method of claim 23 wherein said closing further comprises sealing said cartridge chamber from particulate contaminants and said retaining further comprises keeping said cartridge chamber sealed from said particulate contaminants.

25. A method of preparing one-time-use cameras for recycling, comprising the steps of:
moving a film door away from an opening of a cartridge chamber of the camera;
unloading a film cartridge from said cartridge chamber;
closing said cartridge chamber; and
retaining said cartridge chamber closed and said film door away from said opening;
wherein said closing further comprises moving a closure from a first position within said cartridge chamber into said opening and said moving of said closure further comprises pulling said closure with said film cartridge.

26. The method of claim 25 wherein said unloading further comprises moving said film cartridge out of said cartridge chamber, holding said cartridge external to said chamber, and decoupling said film cartridge from said camera.

* * * * *